United States Patent [19]

Levitz

[11] 3,767,422

[45] Oct. 23, 1973

[54] SHELF STABLE, PARTIALLY BAKED DOUGH COMPOSITION

[75] Inventor: James B. Levitz, St. Paul, Minn.

[73] Assignee: General Mills, Inc., Minneapolis, Minn.

[22] Filed: Jan. 19, 1971

[21] Appl. No.: 107,835

[52] U.S. Cl............... 426/152, 99/150 R, 426/346, 426/523
[51] Int. Cl........................... A21d 8/00, A21d 2/36
[58] Field of Search....................... 99/86, 90 R, 92

[56] References Cited
UNITED STATES PATENTS
2,549,595   4/1951   Gregor................................ 99/90 R Primary Examiner—Raymond N. Jones
Assistant Examiner—James Robert Hoffman
Attorney—Anthony A. Juettner, Gene O. Enockson and Elizabeth Tweedy

[57] ABSTRACT

Dough compositions are prepared which are stable under non-refrigerated conditions for months. The compositions have moisture levels between about 18 percent and 24 percent, contain pregelatinized starch and a cereal component comprising over-worked gluten, are chemically leavened and are partially baked.

7 Claims, No Drawings

SHELF STABLE, PARTIALLY BAKED DOUGH COMPOSITION

This invention relates to partially baked, intermediate moisture dough compositions for bread-like products, which are stable under non-refrigerated conditions for months, and the method for making same. More particularly, this invention relates to dough compositions for bread-like products which: have moisture levels of about 18 to 24 percent by weight of the composition; contain pregelatinized starch; contain a cereal component at least part of which contains over-worked gluten; are chemically leavened; and are partially baked.

Heretofore, partially baked doughs have been commercially available in the form of "brown and serve" bakery products. These products have been stable for only relatively short periods of time, in the order of about 2 weeks. The dough compositions of the present invention are microbiologically stable and retain their ability to produce high quality bread-like products for substantial periods of time—i.e., even up to 20 weeks and longer.

The dough compositions of this invention have a porous, cellular, bread-like texture developed through chemical leavening activity, are partially baked to preserve the porous, cellular, bread-like texture during storage, and are comprised of the following constituents:

about 30 to 50 percent cereal component by weight, on a moisture free basis, of the dough composition, said cereal component including at least 3 percent wheat flour containing overworked gluten, by weight on a mositure free basis, of the dough composition, about 5 to 18 percent pregelatinized starch by weight, on a moisture free basis, of the dough composition, about 2 to 12 percent shortening by weight, on a moisture free basis, of the dough composition, about 1 to 7 percent plasticizer by weight, on a moisture free basis, of the dough composition, about 0.05 to 0.4 percent mold and yeast inhibitor by weight, on a moisture free basis, of the dough composition, and about 18 to 24 percent overall moisture by weight of the dough composition.

"By weight on a moisture free basis" means that the moisture normally associated with the various ingredients has been included in the overall moisture calculation and the percentages of ingredients refer to the non-moisture portion of each ingredient.

The wheat flour containing overworked gluten is generally introduced into the compositions in the form of an overworked dough component comprised of about 60 to 80 percent wheat flour by weight, on a moisture free basis, of the overworked dough component and about 20 to 40 percent water by weight of the overworked dough component. The overworked wheat flour dough component is made by combining the water with the wheat flour and working the mixture until the resulting dough develops adhesive properties and loses its cohesive properties. The resulting overworked dough is sticky and has lost much of its elasticity.

The remainder of the cereal component can be cereal flour or meal. Included among the cereal flours and meals which can be incorporated into the dough are flours and meals derived from wheat, corn, rice and oats. Cereal flours and meals are included in the preferred embodiments of the invention in amounts of from about 30 to 40 percent by weight, on a moisture free basis, of the dough composition.

The pregelatinized starch suitable for the practice of this invention includes gelatinized cereal starch such as wheat and corn, tuber starches such as potato and tapioca and root starches such as sago or arrowroot, and is preferably used in amounts of from about 7 to 9 percent by weight of the total composition.

The shortening component can be either of animal or vegetable origin and solid, plastic or liquid. Commonly used fats and oils are: animal fats such as lard, tallow; hydrogenated animal oils; solid vegetable oils such as hydrogenated vegetable shortenings; and liquid vegetable oils such as corn oil, peanut oil, coconut oil and safflower oil. Dough plasticizers useful in the practice of this invention include the commonly used dough plasticizers such as propylene glycol, glycerine and sorbitol. Good results were obtained when plasticizers were incorporated into the dough in amounts of about 2.5 to 4.0 percent by weight of the total composition. Typical mold and yeast inhibitors that can be used include sodium benzoate, benzoic acid, calcium propionate, sorbic acid, potassium sorbate, calcium sorbate and diethyl pyrocarbonate. Each inhibitor is incorporated in the particular amount at which it prevents yeast and mold growth. Good results were obtained using potassium sorbate in amounts of from about 0.15 to 0.30 percent by weight of the dough composition.

In the process of making the dough compositions of this invention, wheat flour, dough containing overworked gluten, a chemical leavening agent, pregelatinized starch, shortening, dough plasticizer, mold and yeast inhibitor, and sufficient water to bring the moisture level of the processing mixture to about 30 to 50 percent by weight of the total mixture are mixed until the over-developed dough component becomes integrated with the other components to form a uniform dough mass. A cereal flour or meal portion in amounts up to about 90 percent by weight of the total cereal component present in the dough compositions may be incorporated, if desired, in an undeveloped and unworked condition into the mixture of the over-developed wheat flour dough component, shortening, pregelatinized starch, chemical leavening agent, dough plasticizer and mold and yeast inhibitor.

The chemical leavening components suitable for making the compositions of this invention are generally composed of an acidifier and a carbonate salt normally sodium bicarbonate. Suitable acidifiers include monocalcium phosphate monohydrate, sodium aluminum sulfate, sodium acid pyrophosphate, tartaric acid, cream of tartar, lactic acid, acetic acid and mixtures thereof. The chemical leavening agent is included in the mixture to be leavened in amounts of from about 0.5 to 12 percent by weight of the mixture to be leavened. The leavening agent is dissipated during the leavening operation and subsequent baking and is, therefore, normally unidentifiable in the final partially baked dough. Good results were obtained when the leavening agent was used in amounts of from about 1 to 4 percent by weight of the mixture to be leavened and thereafter baked.

When potassium sorbate is used as the mold and yeast inhibitor, precautions are necessary to obtain uniform distribution throughout the dough and particularly that fraction of the final dough which originates in the overworked dough component. One method which can be used is to incorporate the potassium sorbate into the overworked dough component initially. Another method is to add the potassium sorbate to a mixture of the components other than the overworked dough component, subdivide the overworked dough component into small pieces and then mix the overworked dough component into the other components preferably by incremental addition.

Once the components have been combined to form a uniform dough having a moisture level of from about 30 to 50 percent by weight of the total composition, the dough is normally allowed to rest, usually for about 10 to 30 minutes to achieve more plasticity, then sheeted and shaped. After shaping, the dough is partially baked preferably at a temperature of about 250° to 325° F. The baking of the dough is continued until the cellular structure of the dough has become inelastic, somewhat firm but is still pliable and not browned. Doughs sheeted to a thickness of about one eighth inch normally can be partially baked at temperatures of about 300° F. in a period of about 10 minutes. Once the structure of the dough has been stabilized by partial baking, the parially baked dough is dried at a temperature of from about 100° to 200° F. to a moisture content of about 18 to 24 percent by weight of the total composition.

Other ingredients such as flavorings, cereal meals, and seasonings can be added to produce any particular product desired. The sheeted pieces of partially baked, dried dough can be laminated or stacked together to form products having greater thicknesses and different shapes. The partially baked dough, when packaged in such a manner as to maintain a moisture level of from about 18 to 24 percent, is stable for at least 5 months. The partially baked dough is normally finish baked by the consumer for a period of about 10 minutes at a temperature of about 325° to 400° F.

The preparation of the shelf stable, partially baked dough compositions of this invention is illustrated in the following examples.

EXAMPLE I

This example illustrates a procedure for making the shelf stable, partially baked dough compositions of this invention.

A mixture of 62.5 percent wheat flour, 14 percent protein content by weight, on an "as is" basis, and 37.5 percent water by weight were worked with a Hobart Mixer with a dough hook attachment until a developed dough was formed and continued until the adhesiveness of the dough exceeded its cohesiveness. An 8 pound batch of flour and water was overworked in 35 minutes using a Model A-600 Hobart Mixer with dough hook attachment.

The overworked dough component and the other ingredients were combined according to the following formulation:

| | Percent by Weight of the Dough Mixture on an "As is" Basis |
|---|---|
| Overworked wheat flour dough component | 26.93 |
| Patent Wheat Flour | 26.43 |
| Pregelatinized Tapioca Starch (Instant Jel T-8, National Starch Co.) | 8.85 |
| Plastic Shortening* | 6.98 |
| Glycerine | 4.42 |
| Active Dry Yeast | 2.32 |
| Sodium Aluminum Phosphate (Actif 8, Stauffer Chem. Co.) | 1.24 |
| Salt, fine flour grind | 0.93 |
| Sodium Bicarbonate | 0.91 |
| Potassium Sorbate | 0.41 |
| Water | 20.58 |
| Total: | 100.00 |

*A plastic tallow base shortening containing tallow flakes and rearranged lards in amounts up to about 10% by weight, stabilized with butylhydroxy toluene and butylhydroxy anisol and having a solid fat index of:

| Temperature | S. F. I. |
|---|---|
| 50°F. | 29–33% |
| 70°F. | 21–24% |
| 80°F. | 19–22% |
| 92°F. | 14–17% |
| 104°F. | 8–10% |

The potassium sorbate was dissolved in a portion of the added water. The pregelatinized tapioca starch, yeast, dextrose, Patent wheat flour, shortening, glycerine, salt, sodium aluminum phosphate, and sodium bicarbonate were dry blended. The potassium sorbate solution and the yeast and dextrose solution were added to the dry blend. The mixture was worked at moderate speed on a Hobart Mixer with a double hook attachment for a period of 20 minutes. The overworked dough component was subdivided into small pieces and added at the beginning of the working period. After working the dough composition was allowed to rest for a period of 15 minutes. It was then sheeted to a thickness of about one-eighth inch. Once sheeted, the dough was baked for a period of about 11 minutes at a temperature of about 300° F. Following baking the partially baked dough was dried at a temperature of about 150° F. for a period of about 10 minutes. It was thoroughly cooled before packaging in Kraft poly foil poly pouches. The final moisture content of the dough was about 23.66 percent by vacuum oven analysis. Samples of the packaged, partially baked dough were stored at room temperature and at a temperature of about 100° F. After 16 weeks storage at a temperature of about 100° F. and 20 weeks storage at room temperature there was no significant indication of deterioration, bacteriological or yeast or mold growth. Upon completion of storage, the samples were finish baked and had good flavor, a bread-like texture and good eating quality.

EXAMPLE II

This example illustrates another formulation for preparing a shelf stable, partially baked dough composition of this invention.

The overworked dough component was composed of 62.5 percent wheat flour (Patent Wheat Flour) by weight of the overworked dough component and 37.5 percent water by weight of the overworked dough component. The mixture was worked until the dough developed and then working was continued until the dough lost its cohesiveness and became sticky.

An overworked dough and the other ingredients were combined according to the following formulation:

| | Percent by Weight of the Dough Mixture on an "As is" Basis |
|---|---|
| Overworked Wheat Flour dough component | 26.57 |
| Masa Harina | 26.57 |
| Pregelatinized Tapioca Starch (Instant Jel T-8, National Starch Co.) | 8.73 |
| Plastic Shortening* | 6.89 |
| Glycerine | 4.36 |

| | |
|---|---|
| Salt, fine flour | 2.00 |
| Sodium Aluminum Phosphate (Actif 8, Stauffer Chemical Co.) | 1.23 |
| Potassium Sorbate | 0.50 |
| Water | 22.25 |
| Total: | 100.00 |

*See footnote, Example I

The masa harina, pregelatinized tapioca starch, plastic shortening, salt and sodium bicarbonate were dry blended. The potassium sorbate was dissolved in a portion of the water. The glycerine, water and potassium sorbate solution were added to the blend of dry ingredients. The overworked dough component was added in small pieces. The mixture was worked on a Hobart mixer until a uniform dough was formed and then rested. The resulting dough was sheeted to a thickness of about one-fourth inch and partially baked at a temperature of about 300° F. for a period of about 10 minutes. The partially baked dough was then dried at a temperature of about 150° F. for a period of about 10 minutes to attain an end moisture content of about 23 percent. The partially baked dough was finally packaged after cooling in Kraft poly foil pouches.

Samples were placed in storage at room temperature. After eight weeks, no significant bacterial, yeast or mold growth was indicated. When the samples were finish baked, the resulting product had a good flavor, bread-like texture and good eating quality.

EXAMPLE III

This example further illustrates the variables of the drying process.

Using the same formulation as Example I, the same mixing procedure, the drying process was modified as follows:

The dough composition was baked at a temperature of about 300° F. for a period of approximately 10 minutes which was followed by a 30 minute drying period at a temperature of about 150° F. The resulting product had an end moisture of approximately 18 percent, microbiological stability of at least 8 weeks. When the samples were finish baked, the resulting product had a good flavor, bread-like texture and good eating quality.

The embodiments of the invention in which an exclusive property or privilege is claimed are defined as follows:

1. A shelf stable, dough composition comprising:
   about 30 to 50 percent cereal flour or meal component by weight, on a moisture free basis, of the dough composition, said cereal component containing at least 3 percent wheat flour containing overworked gluten, on a moisture free basis, by weight of the dough composition,
   about 5 to 18 percent pregelatinized starch by weight, on a moisture free basis, of the dough composition,
   about 2 to 12 percent shortening by weight, on a moisture free basis, of the dough composition,
   about 1 to 7 percent plasticizer by weight, on a moisture free basis, of the dough composition,
   about 0.05 to 0.4 percent mold and yeast inhibitor by weight, on a moisture free basis, of the dough composition, and
   about 18 to 24 percent overall moisture by weight of the dough composition,
   said shelf stable dough composition having a porous, bread-like texture developed by chemical leavening and said shelf stable dough composition being partially baked.

2. The composition of claim 1 wherein said cereal component includes up to about 45 percent cereal flour or meal by weight, on a moisture free basis, of the dough composition.

3. The dough composition of claim 1 wherein pregelatinized starch is included in amounts of from about 7 to 9 percent by weight, on a moisture free basis, of the dough composition.

4. The dough composition of claim 1 wherein the cereal flour or meal is included in amounts of from about 30 to 40 percent by weight, on a moisture free basis, of the total composition.

5. A process for making a shelf stable dough composition having a cellular porous bread-like texture which comprises combining:
   about 30 to 50 percent cereal flour or meal component by weight, on a moisture free basis, said cereal component including at least 3 percent wheat flour containing overworked gluten by weight on a moisture free basis,
   about 5 to 18 percent pregelatinized starch by weight on a moisture free basis,
   about 2 to 12 percent shortening by weight, on a moisture free basis,
   about 1 to 7 percent plasticizer by weight, on a moisture free basis,
   about 0.05 to 0.4 percent mold and yeast inhibitor by weight, on a moisture free basis,
   all percentages based upon a dough composition having a moisture content of about 18 to 24 percent by weight, and
   sufficient water to bring the moisture content of the combination to about 30 to 50 percent by weight of the combination,
   mixing said combination of materials to form a uniform dough mass,
   allowing the resulting dough mass to rest,
   shaping the dough mass,
   partially baking the dough mass until the cellular structure of said dough mass becomes inelastic, somewhat firm but still pliable,
   drying said dough mass to a moisture content of from about 18 to 24 percent by weight of the dough composition.

6. The process of claim 5 wherein the wheat flour containing overworked gluten is made by forming a mixture of about 60 to 80 percent cereal flour by weight, on a moisture free basis, of the mixture and 20 to 40 percent water by weight of the mixture, working the resulting mixture into a dough and working the dough until the adhesiveness of the dough exceeds its cohesiveness.

7. The process of claim 5 wherein the pregelatinized starch is included in amounts of about 7 to 9 percent by weight on a moisture free basis.

* * * * *